(12) United States Patent
Ma et al.

(10) Patent No.: US 7,616,646 B1
(45) Date of Patent: *Nov. 10, 2009

(54) INTRASERVER TAG-SWITCHED DISTRIBUTED PACKET PROCESSING FOR NETWORK ACCESS SERVERS

(75) Inventors: Stephen Ma, Santa Clara, CA (US); Suresh Sangiah, Fremont, CA (US); Jagannadh Tangirala, Campbell, CA (US); R. Ashby Armistead, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 862 days.

This patent is subject to a terminal disclaimer.

(21) Appl. No.: 09/735,718

(22) Filed: Dec. 12, 2000

(51) Int. Cl.
 *H04L 12/28* (2006.01)
(52) U.S. Cl. ...................... 370/401; 370/392
(58) Field of Classification Search ............... 370/400, 370/401, 471, 474, 466, 392, 352; 709/230
See application file for complete search history.

(56) References Cited

U.S. PATENT DOCUMENTS

| | | | |
|---|---|---|---|
| 5,566,170 A | 10/1996 | Bakke et al. | |
| 5,796,732 A | 8/1998 | Mazzola et al. | |
| 6,160,811 A | 12/2000 | Partridge et al. | |
| 6,243,380 B1 * | 6/2001 | Malkin | 370/392 |
| 6,522,627 B1 * | 2/2003 | Mauger | 370/230 |
| 6,539,029 B1 | 3/2003 | Toivanen | |
| 6,633,565 B1 * | 10/2003 | Bronstein et al. | 370/392 |
| 6,763,018 B1 | 7/2004 | Puthiyandyil et al. | |
| 6,876,657 B1 * | 4/2005 | Brewer et al. | 370/394 |
| 6,954,463 B1 | 10/2005 | Ma et al. | |

OTHER PUBLICATIONS

Galileo Technology; *System Controllers and PCI Interfaces* printed on Apr. 17, 2000 from website located at www.galileot.com/tbrief/64120tb.htm; pp. 1-2.

(Continued)

*Primary Examiner*—Duc C Ho
(74) *Attorney, Agent, or Firm*—Stolowitz Ford Cowger LLP

(57) ABSTRACT

An access server architecture, and methods for use of the architecture to increase the scalability of and balance processor load for a network access server device, are disclosed. In this architecture, packet forwarding and packet processing are distributed amongst cards serving low-speed access lines (i.e., line cards). Thus, as the number of line cards expands, forwarding resources are expanded in at least rough proportion. The NAS route switch controller and the high-speed ports used to access the network are largely relieved of packet processing tasks for traffic passing through the server. The egress port uses a distribution engine that performs the routing lookup for packets received at the high-speed interface, tags the packets with an adjacency table pointer, and sends them to the appropriate forwarding engine for packet processing. The route switch controller, largely uninvolved in the processing of packets, updates routing information needed by each distribution or forwarding engine.

25 Claims, 10 Drawing Sheets

OTHER PUBLICATIONS

MMC Networks; *EPIF-200 Packet Processor Product Overview* and product description printed on Jan. 17, 2000 from website located at www.mmcnet.com/Solutions/epif200.asp; pp. 1-5.

MMC Networks; *XPIF-300 Packet Processor Product Overview* and product description printed on Jan. 17, 2000 from website located at www.mmcnet.com/Solutions/xpif300.asp; pp. 1-5.

MMC Networks; *AnyFlow 5500 Product Overview* and product description printed on Jan. 17, 2000 from website located at www.mmcnet.com/Solutions/anyflow5500.asp; pp. 1-6.

MMC Networks; *AnyFlow 5400 Product Overview*; pp. 1-3.

MMC Networks; *GPIF-207 Packet Processor Product Overview* and product description printed on Jan. 17, 2000 from website located at www.mmcnet.com/Solutions/gpif207.asp; pp. 1-4.

Galileo Technology; System Controles and PCI interfaces printed on Apr. 17, 2000 from website located at www.galileot.com/tbriefs/64120tb.htm; pp. 1-2.

MMC Networks; EPIF-200 Packet Processor Product Overview and product description printed on Jan. 17, 2000 from website located at www.mmcnet.com/Solutions/epif200.asp pp. 1-5.

MMC Networks; XPIF-300 Packet Processor Product Overview and product description printed on Jan. 17, 2000 from websitre located at www.mmcnet.com/Solutions/xpif300.asp pp. 1-5.

MMC Networks; AnyFlow 5500 Product Overview and product description printed on Jan. 17, 2000 from website located at www.mmcnet.com/Solutions/anyflow5500.asp pp. 1-6.

MMC Networks;AnyFlow 5400 Product Overview; pp. 1-3.

MMC Networks; GPIF-207 Packet Processor Product Overview and product description printed on Jan. 17, 2000 fom website located at www.mmcnet.com/Solutions/gpif207.asp pp. 1-4.

\* cited by examiner

| Destination IP Route | Line Card No. | Modem No. | Adjacency Table Pointer |
|---|---|---|---|
| A.B.C.D | RSC | - | |
| A.B.E.F | LC0 | 1 | |
| A.B.C | LC4 | 3 | |
| A.B.G | LC8 | 2 | |
| ⋮ | ⋮ | ⋮ | |
| A.H | LC1 | 6 | |

310

| VoIP UDP Port No. | Line Card No. | Modem No. | Adjacency Table Pointer |
|---|---|---|---|
| 16384 | LC0 | 0 | |
| 16390 | LC0 | 2 | |
| 16420 | LC0 | 5 | |
| 16900 | LC1 | 5 | |
| ⋮ | ⋮ | ⋮ | |
| 23550 | LC13 | 3 | |

312

| L2TP Call ID/ Tunnel ID | Line Card No. | Modem No. | Adjacency Table Pointer |
|---|---|---|---|
| 5/6 | LC0 | 3 | |
| 17/3 | LC0 | 4 | |
| 103/16 | LC0 | 7 | |
| 273/6 | LC1 | 2 | |
| ⋮ | ⋮ | ⋮ | |
| 1942/8 | LC13 | 9 | |

314

| Adjacency Table Pointer | Stream ID | Backplane Header |
|---|---|---|
| | | |

INTRASERVER TAG-SWITCHED DISTRIBUTED PACKET PROCESSING FOR NETWORK ACCESS SERVERS

FIELD OF THE INVENTION

This invention pertains generally to packet data network access servers, and more particularly to methods and apparatus for performing distributed packet processing within such an access server.

BACKGROUND OF THE INVENTION

In the data communications field, a packet is a finite-length (generally several tens to several thousands of octets) digital transmission unit comprising one or more header fields and a data field. The data field may contain virtually any type of digital data. The header fields convey information (in different formats depending on the type of header and options) related to delivery and interpretation of the packet contents. This information may, e.g., identify the packet's source or destination, identify the protocol to be used to interpret the packet, identify the packet's place in a sequence of packets, provide an error correction checksum, or aid packet flow control.

Typically, packet headers and their functions are arranged in an orderly fashion according to the open-systems interconnection (OSI) reference model. This model partitions packet communications functions into layers, each layer performing specific functions in a manner that can be largely independent of the functions of the other layers. As such, each layer can prepend its own header to a packet, and regard all higher-layer headers as merely part of the data to be transmitted. Layer 1, the physical layer, is concerned with transmission of a bit stream over a physical link. Layer 2, the data link layer, provides mechanisms for the transfer of frames of data across a single physical link, typically using a link-layer header on each frame. Layer 3, the network layer, provides network-wide packet delivery and switching functionality—the well-known Internet Protocol (IP) is a layer 3 protocol. Layer 4, the transport layer, can provide mechanisms for end-to-end delivery of packets, such as end-to-end packet sequencing, flow control, and error recovery—Transmission Control Protocol (TCP), a reliable layer 4 protocol that ensures in-order delivery of an octet stream, and User Datagram Protocol, a simpler layer 4 protocol with no guaranteed delivery, are well-known examples of layer 4 implementations. Layer 5 (the session layer), Layer 6 (the presentation layer), and Layer 7 (the application layer) perform higher-level functions such as communication session management, data formatting, data encryption, and data compression.

Packet-switched networks provide an efficient switching mechanism for the delivery of packetized data traffic. The "Internet" is a collection of interconnected packet-switched networks that use layer 3 Internet Protocol (IP) as a packet delivery mechanism. Each packet-switched data network typically contains a core or backbone, made up of switches and routers connected by high-speed layer 1/layer 2 links (as used herein, a router is a device that performs packet-by-packet forwarding based on packet header fields above layer 2, whereas a switch is a layer 2 forwarding or bridging device).

In the Internet model, the core network has no centralized control entity governing how each packet will traverse the network. Instead, each router is highly optimized for the task of forwarding packets across the network, and maintains dynamic routing tables that allow it to make packet forwarding decisions autonomously (although routing information is shared between routers).

Historically, much of the traffic on the Internet has consisted of traffic between large computer hosts, each host connecting networked computer users at a government, educational, or commercial institution to the Internet. Today, however, a significant portion of network traffic goes through an Internet Service Provider (ISP) or other similar gateway. An ISP provides Internet access to residential customers, small businesses, and other organizations, typically via the PSTN (Public Switched Telephone Network). ISP customers connect their computing devices to their ISP using, e.g., an analog modem and a standard POTS (Plain Old Telephone Service) connection, a wireless phone connection, an ISDN (Integrated Services Digital Network) connection, a Digital Subscriber Line (DSL), or a cable modem.

Many ISPs also offer additional network access capabilities, such as Virtual Private Networking (VPN), using protocols such as L2TP (Layer 2 Tunneling Protocol). Without L2TP, a remote user could dial in to a private data network by initiating a PSTN physical connection to a network access server (NAS) on that private network. A Point-to-Point Protocol (PPP) layer 2 link established across this connection would then allow the user to communicate with the NAS. L2TP removes the requirement that the user dial in to the private network directly, by allowing the layer 2 endpoint and the PPP endpoint to reside on different devices connected to a packet-switched network. With L2TP, the user dials in to an ISP, for example. The ISP sets up a packet tunnel to a home gateway (HGW) in the private network, and PPP frames are tunneled from the ISP to the HGW in LP packets. Thus L2TP, and similar protocols, allow private networks to be extended to virtually any location connected to the Internet.

Finally, an ISP (or private NAS) can also offer voice-over-packet network (e.g., VoIP) services. With VoIP, a voice data stream is packetized and transmitted over the packet network. If the calling party or the called party (or both) do not have a "soft(ware) phone" or an IP phone, a call's bearer channel data will require translation, e.g., by an ISP, between the digital time-division-multiplexed (TDM) pulse-code-modulated (PCM) format used by the PSTN and the packet format used by the packet network. When the ISP supplies translation, the ISP will typically implement sophisticated algorithms such as voice activity detection, echo cancellation, compression, and buffering in addition to packetization, in order to reduce call bandwidth while maintaining an acceptable quality of service.

Whether users wish to simply connect their computers to the Internet, tunnel through the Internet to reach a private network, or transmit voice calls across the Internet, the ISP's high-level technical goal remains the same: to serve as a packet network traffic aggregation point for a large number of users with relatively low-speed data connections. As demand increases for network access, virtual private networking, and packet voice, ISPs continue to search for cost-effective ways to provide these services to more users.

Most ISPs deliver the services described above using a network access server. These devices are a type of router that is specifically designed for the task of routing traffic between a large number of low-speed interfaces (called ingress interfaces) and a small number of high-speed interfaces (called egress interfaces). Such servers, like other routers, use a packet forwarding engine to process and route incoming packets to an appropriate outgoing interface. But in addition to packet forwarding, access servers perform a variety of other specialized, data processing-intensive tasks that are not typically found in other types of routers. These functions are, e.g., those required to support PSTN signaling and bearer channel formats, deliver dial-in PPP endpoint and modem functionality, private network tunneling endpoint functionality, and VoIP-to-PCM conversion. As a result, access servers typically use a high-speed forwarding engine for packet processing and routing, and multiple digital signal processors (DSPs) to provide modem and voice packetization services on the ingress ports.

SUMMARY OF THE INVENTION

Today's access servers can serve thousands of concurrent users. A typical design allows the number of concurrent users to be expanded by simply adding modular feature boards (i.e., "line cards") to increase the number of ingress ports and corresponding DSP resources. This scheme could allow an access server to scale to serve ever-larger numbers of users, were it not for the additional demands each feature board places on the router's forwarding engine. The forwarding engine can only process a bounded number of packets per second, irrespective of the number of ingress ports. This limit effectively forms a bottleneck to increasing ingress port count.

The disclosed embodiments describe a new access server architecture, and method for use of the architecture, designed to increase the scalability of and balance processor load for a network access server device. In this architecture, packet forwarding and packet processing are distributed amongst the line cards, such that each line card is responsible for performing forwarding and packet processing for packets associated with the ingress ports that line card serves. Thus, as the number of line cards expands, forwarding resources are expanded in at least rough proportion.

Because of the access server traffic model, an additional bottleneck can develop at the egress port(s) with this distributed concept. In a typical access server deployment, traffic flows mainly between the egress ports and the ingress ports. Traffic between egress ports, between ingress ports, or destined for the access server itself comprises a small fraction of total traffic. Thus, for two-way packet voice traffic, the egress port receives roughly half of all packets received by the access server. For other types of traffic, where user downloads typically predominate over user uploads, the egress port may receive significantly more than half of the overall packets received. Were a single forwarding engine deployed for all packets received at the egress port, this engine would in all probability have to perform packet processing on over half of all packets traversing the access server, once again compromising the scalability of the architecture.

This potential egress port bottleneck is also addressed by the disclosed embodiments. Line cards preferably not only perform packet processing and forwarding for data received at the ingress ports they serve—each line card also performs packet processing and forwarding for packets received at the egress port but bound for the ingress ports served by that card. The packet processing computational power needed at the egress port consequently decreases substantially. The egress port preferably uses a distribution engine that performs a cursory examination on one or more header fields on packets received at the egress interface-comprehending only enough information to allow each packet to be distributed to the appropriate line card for full packet processing.

The distribution engine must perform a routing table search in order to distribute a packet to a line card forwarding engine. Since the distribution engine does not modify the packet contents, the forwarding engine would ordinary have to repeat this routing table search upon receiving the packet from the distribution engine. But with just a little more effort, the results of the first search can be communicated to the forwarding engine, allowing the forwarding engine to locate the routing table entry it needs to process the packet without having to perform a second search of the routing table. One method of communicating the search results is to have the distribution engine attach a temporary tag to the packet—a tag that allows the forwarding engine to locate the routing table entry without a second search. This technique is particularly effective when performing a routing table search on the forwarding engine would be costly.

BRIEF DESCRIPTION OF THE DRAWING

The invention may be best understood by reading the disclosure with reference to the drawing, wherein:

FIGS. 10-11 show routing table configurations for an embodiment of the invention.

DETAILED DESCRIPTION OF THE EMBODIMENTS

Several embodiments are described below. These embodiments refer to several existing protocols, standards, and particular component devices useful in practicing the invention. These references are merely exemplary, as those of ordinary skill will appreciate that various alternatives and equivalents are available.

Figure 1:
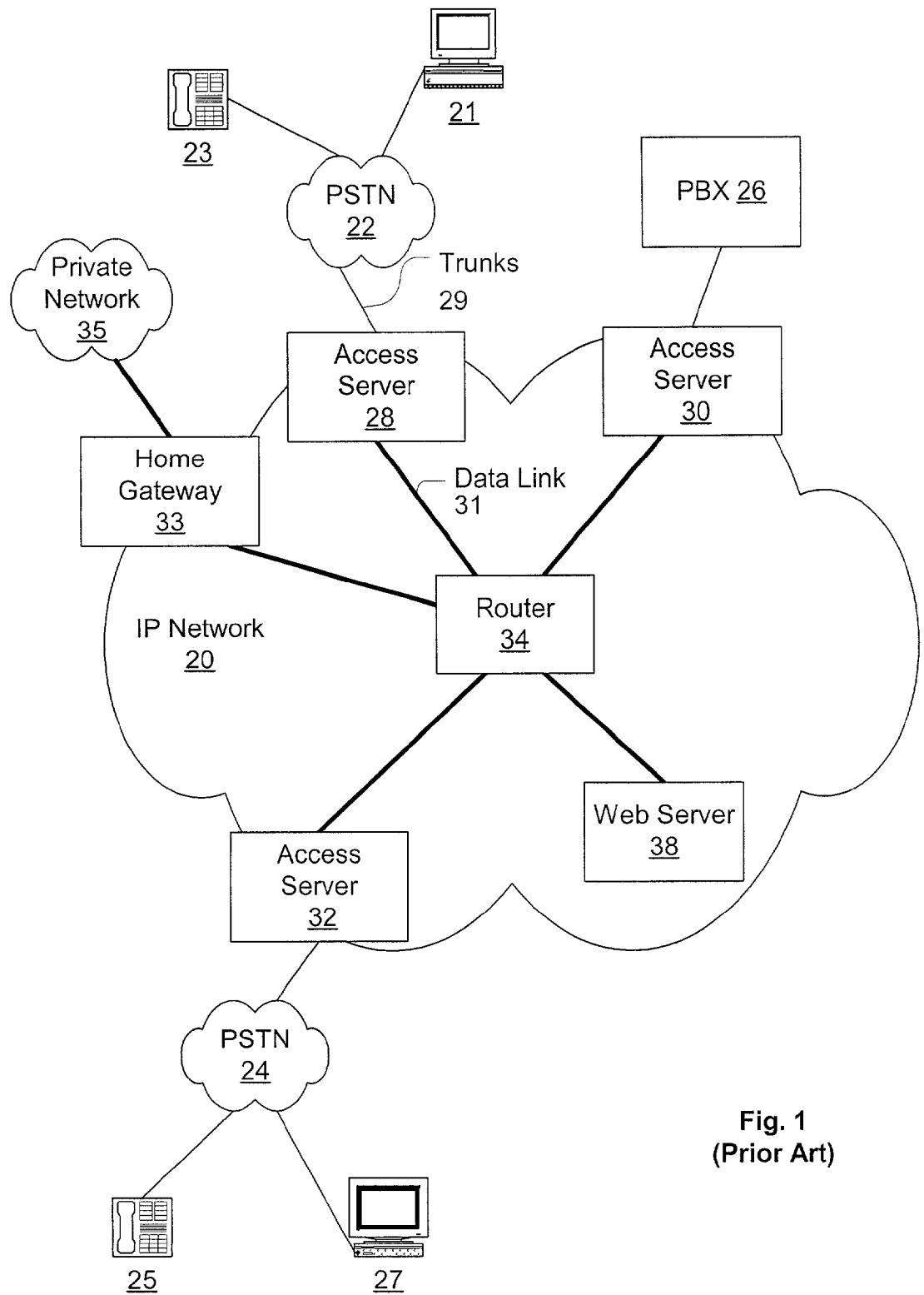
FIG. 1 illustrates NAS deployment in an IP network.

As an introduction, FIG. 1 illustrates a prior art deployment of network access servers. Access server 28 connects to PSTN 22 via one or more PSTN trunks 29, where each trunk is, e.g., a T1, T3, or E1 time-division-multiplexed (TDM) trunk, an ISDN Primary Rate Interface (PRI), or some equivalent. The access server users themselves (a computer user 21 and a telephone user 23 are shown) connect to PSTN 22, which provides physical connectivity to access server 28 via trunks 29. Depending on trunk capacity and utilization, each trunk will allow some number of additional users to reach IP network 20 through access server 28, for example, each added T1 connection allows up to 24 additional users (voice or data) to connect to server 28.

Access server 28 also maintains at least one egress interface. The egress interface connects to one (or a relatively small number of) high-speed packet data links to other nodes in IP network 20. FIG. 1 shows a data link 31 connecting server 28 to core network router 34.

Two additional access servers, 30 and 32, are also shown. Access server 30 connects a business PBX (Private Branch Exchange) 26 to IP network 20, e.g., to provide PBX VoIP access to/from remotely-located employees and branch offices of the business. Access server 32 connects to PSTN 24 (which will typically also be reachable by a circuit-switched connection from PSTN 22), which in turn connects to additional users 25 and 27.

A web server 38 is also illustrated connected in IP network 20. In the illustrated configuration, users can connect through the access servers to web server 38, or to each other. Router 34 is also illustrated as providing connectivity to a private network 35 through a home gateway 33.

Of course, the actual network can contain many more access servers, core network routers, and servers than shown in FIG. 1.

Each access server exchanges control signaling with the PSTN (or a PBX) for each trunk terminated at that access server. The access server typically also maintains a network access session for each active user. The details of how control signaling is exchanged, and how network access sessions are initiated, maintained, and terminated are well known, and will not be described further in any aspect not affected by the invention.

Figure 2:
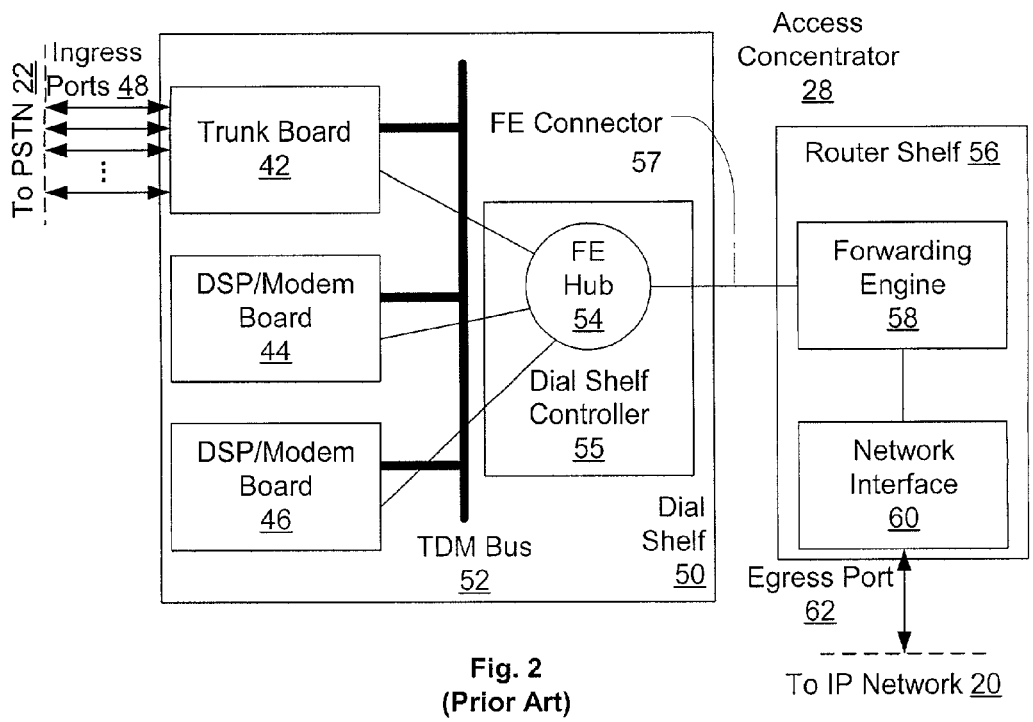
FIG. 2 contains a high-level block diagram of a prior art NAS.

FIG. 2 shows a prior art access server 28. Access server 28 comprises two separate rack-mountable chassis, a "dial shelf" 50 and a "router shelf" 56. Dial shelf 50 performs PSTN line interface tasks (including modem emulation, VoIP packet translation, etc.), and router shelf 56 performs packet routing tasks. Dial shelf 50 and router shelf 56 exchange data in packets via a Fast Ethernet (FE) connector 57.

Dial shelf 50 is a modular chassis unit having a backplane that accepts several different types of circuit boards. The dial shelf is managed by a dial shelf controller board 55. Trunk board 42 provides multiple ingress ports 48 that can be used to terminate trunks from a PSTN 22. DSP/modem boards 44 and 46 are identical, and provide pooled signal processing resources for use in modem emulation, VoIP packet translation, etc. Dial shelf 50 may incorporate redundant dial shelf controller boards, and/or additional trunk and DSP/modem boards (not shown).

Dial shelf 50's backplane includes a TDM bus 52 and a FE bus. TDM bus 52 multiplexes time-slotted data to/from ingress ports 48 onto bus time slots, allowing this data to be passed between trunk board 42 and DSP/modem boards 44 and 46. Router shelf 56 assigns specific DSP resources to each active session, and instructs trunk board 42 and the assigned DSP/modem board which time slot(s) on TDM bus 52 are to be used for that session.

Dial shelf controller 55 also contains a FE hub 54, which connects via the backplane FE bus to each of the trunk and DSP/modem boards. When a DSP/modem board builds out a VoIP or L2TP tunnel packet, it does so with a layer 2 (L2) Ethernet header addressed to router shelf 56. When a DSP/modem board receives a PPP frame, it encapsulates the frame with a layer 2 (L2) Ethernet header addressed to router shelf 56. In either case, the resulting frame is transmitted from the DSP/modem board to 110 forwarding engine 58 via FE hub 54 and FE connector 57.

Forwarding engine 58 performs traditional routing tasks for the received frame. Forwarding engine 58 strips the L2 Ethernet header, processes the packet's headers, and looks up the next hop for the IP packet. A new L2 header is prepended to the packet, and the resulting frame is queued to network interface 60 (e.g., another FE interface) for transmission onto IP network 20.

When a packet is received at network interface 60 from IP network 20, a process complementary to the one described above is performed. In short, all packets received on egress port 62 are passed to forwarding engine 58, which modifies each packet's IP header, looks up the appropriate "next hop" DSP/modem board, and places the packet in a FE frame addressed to that DSP/modem board. The frame is then transmitted via FE connector 57 and FE hub 54 to the appropriate DSP/modem board on dial shelf 50.

Because of the modular nature of the dial shelf, additional ingress ports can be readily accommodated. TDM bus 52 is designed to handle a traffic volume at least equal to the maximum number of ingress ports supported by the access server. As more trunk boards are added, more companion DSP/modem boards can also be added to handle the additional port traffic.

As ingress port traffic scales upwards, several egress-related bottlenecks may become traffic-limiting factors in the access server of FIG. 2. One bottleneck is the FE bus used to connect the dial shelf's feature boards to the router shelf's forwarding engine—this bus is limited to FE capacity (100 Mbps). A second bottleneck is the forwarding engine itself—this single engine must perform forwarding lookup and header manipulation for every packet processed by the access server. Thus if the number of active ingress ports doubles, the demand placed on the forwarding engine also roughly doubles. Roughly half of these packets will be received at egress port 62.

Figure 3:
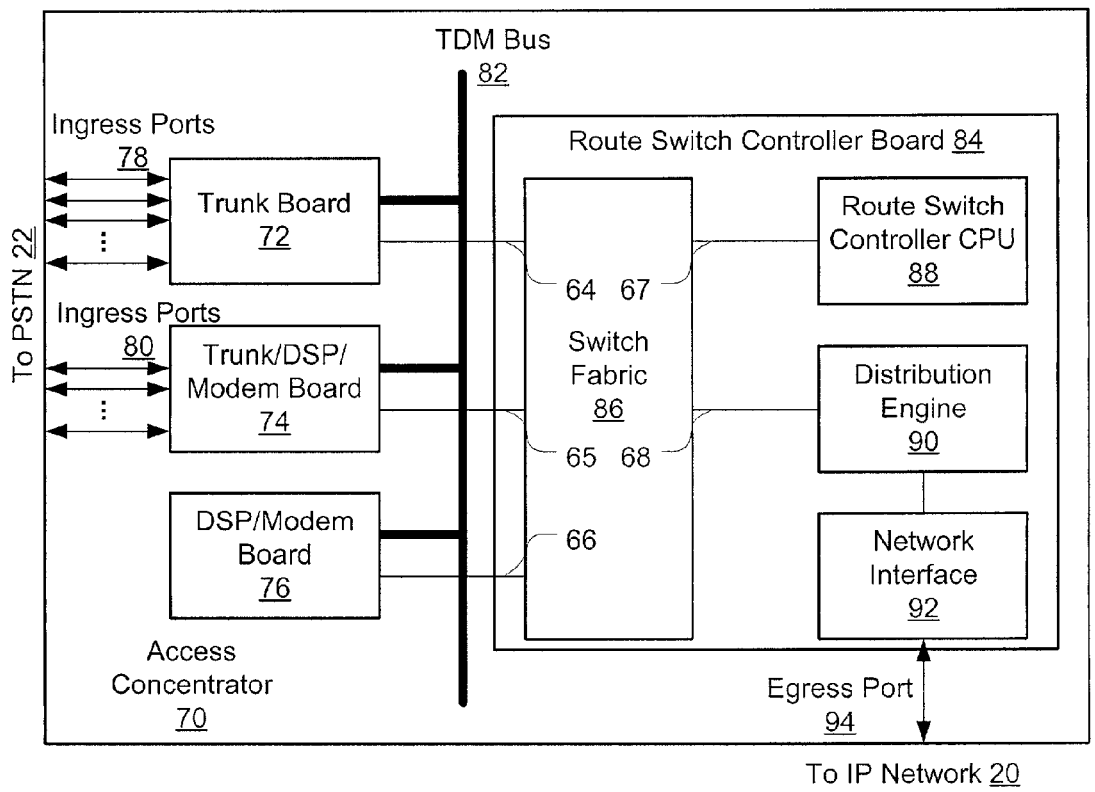
FIG. 3 contains a high-level block diagram for an NAS according to an embodiment of the invention.

FIG. 3 contains a high-level block diagram for an access server 70 according to one embodiment of the invention. Access server 70 utilizes a single modular chassis which accepts four types of circuit boards: a trunk board 72 and a DSP/modem board 76, which in some embodiments may be respectively identical, hardware-wise (but not software-wise) to trunk board 42 and DSP/modem board 44 of FIG. 2; a trunk/DSP/modem board 74, which is a hybrid board containing both trunk interfaces and DSP/modem resources; and a route switch controller board 84.

Comparing FIG. 2 with FIG. 3, several significant differences are plainly evident. First, the FE hub of FIG. 2 does not exist in FIG. 3; instead, a non-blocking switch fabric—with dedicated FE connections 64, 65, 66, 67, and 68—connects the ingress line cards 72, 74, 76 to the egress port network interface 92 and to a route switch controller CPU 88. Second, the single forwarding engine 58 of FIG. 2 is no longer used; instead, forwarding engine functionality is incorporated in line cards 74 and 76, with a backup forwarding engine implemented on RSC CPU 88. For packets arriving at egress port 94, a distribution engine 90 determines which line card the packet belongs to, and distributes that packet to the forwarding engine on the appropriate line card for packet processing.

The access server 70 of FIG. 3 provides improved load-balancing and scalability. Distribution engine 90 preferably provides only the minimal amount of processing necessary to push egress packets to the appropriate line card for packet processing. Because the amount of processing performed in distribution engine 90 is minimized, the engine can be implemented with high-speed routing hardware—thus high egress packet throughput rates are possible. The forwarding engine located on each line card (e.g., 74, 76) performs CPU-intensive tasks such as header manipulation and forwarding to the appropriate DSP resources on that board. Because each such board has its own forwarding engine, forwarding resources remain adequate as the system scales to handle more calls.

Figure 4:
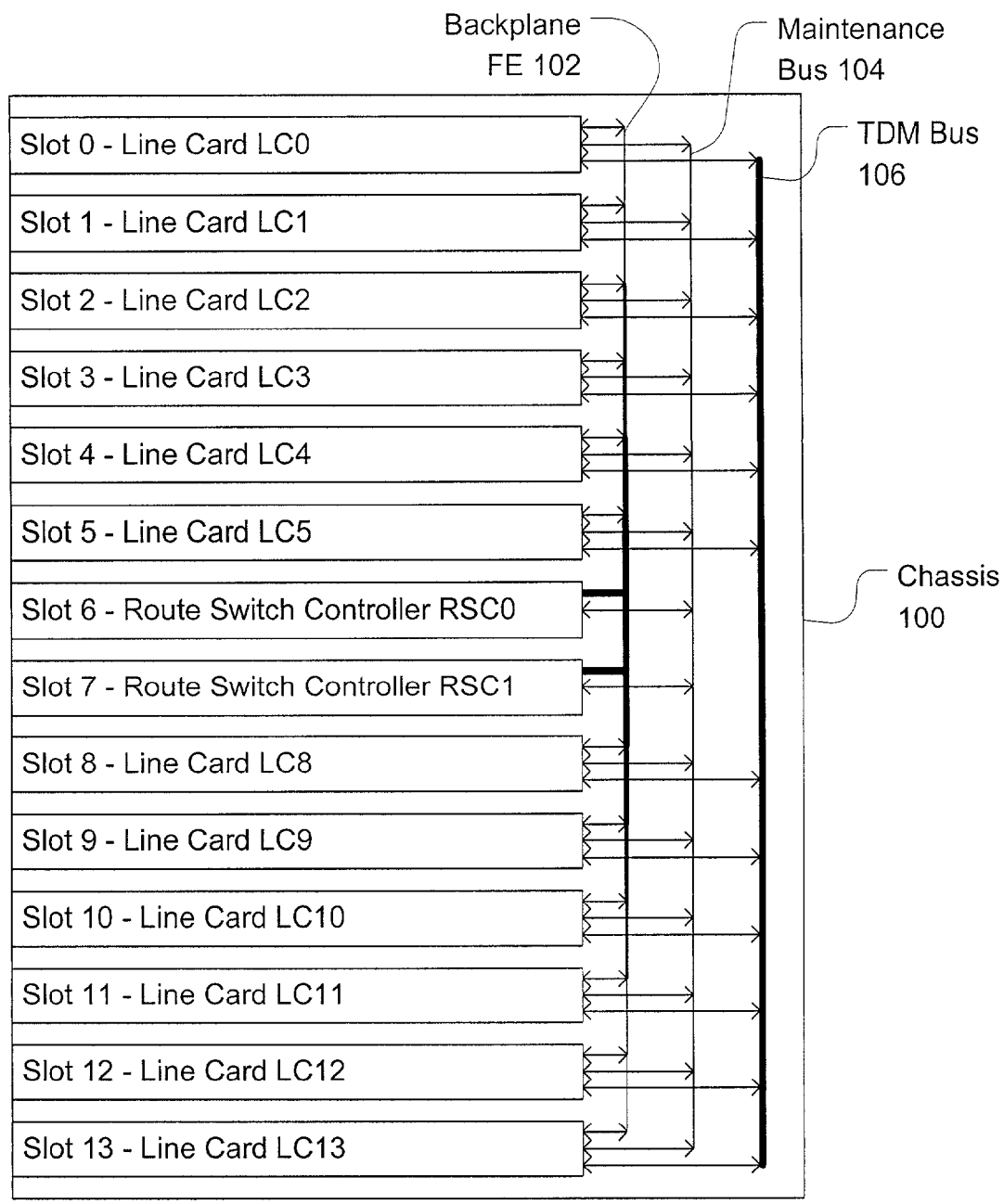
FIG. 4 illustrates one configuration for a modular NAS according to an embodiment of the invention.

A preferred architecture for access server 70, as illustrated in FIGS. 4 through 7, will now be described. Referring to FIG. 4, a top view for a chassis configuration (not to scale) is illustrated. Chassis 100 is a rack-mountable chassis with 14 slots (slot 0 through slot 13). The center two slots are reserved for two route switch controller (RSC) cards RSC0 and RSC1.

Each line card is assigned to only one RSC at any one time. Each RSC card carries a CPU core, a switch fabric, an egress port option card, an optional daughter card to support packet encryption, a removable flash device, a front panel FE port, and console/auxiliary ports. The other slots may be used for up to twelve line cards, LC0 through LC5 and LC8 through LC13. Each line card can be of one of the three types 72, 74, 76 shown in FIG. 3.

The backplane of chassis 100 comprises three primary buses—a backplane FE interconnect 102, a maintenance bus 104, and a TDM bus 106. Backplane FE interconnect 102 comprises twenty-four point-to-point, full-duplex 100 Mbps FE links. Each link connects one of slots 0-5 and 8-13 to slots 6 and 7. Maintenance bus 104 is a controller area network bus, which uses a two-wire serial multi-master interface that provides a maximum transfer rate of 1 Mbps. TDM bus 106 is actually an aggregation of four separate circuit-switched buses, each supporting 2048 bi-directional 64 kbps channels. Each of the resulting 8192 channels is accessible at each of slots 0-5 and 8-13. Not shown is a reference clock line for the TDM bus—the source of the reference clock can be selected as either a front panel-connected reference on one of RSC0 and RSC1, an internally-generated free-running clock on one or RSC0 and RSC1, or a signal derived from any trunk port on one of the line cards. Also not shown is a bus linking RSC0 and RSC1 to backplane nonvolatile random-access memory (NVRAM), which stores MAC addresses for the chassis, etc.

Backplane FE interconnect 102 and TDM bus 106 provide data paths, respectively, for the bearer packet data and circuit-switched data streams that pass between the various cards in chassis 100. Specific usage of these data paths is detailed at a later point in this specification.

Maintenance bus (MBUS) 104 provides a highly reliable, fault-tolerant bus for overall chassis control. For instance, at system startup, RSC0 and RSC1 use the MBUS to arbitrate, e.g., based on slot number, which line card slots are assigned to each RSC. Each RSC also periodically broadcasts its status over the MBUS—if one RSC does not receive a status message for a predetermined time, the other RSC restarts mastership arbitration. The RSC also uses the MBUS to discover the line cards installed in chassis 100, to power on/off selected line cards, and to reset the line cards. When a line card is powered on or rebooted, the RSC uses the MBUS to download a boothelper image to that line card. While a line card is running, the MBUS allows the RSC to monitor temperature and voltage on the line card, and to provide a virtual console connection (e.g., through a software patch to the RSC's physical console connection) to the line card. If a line card takes a fatal exception, the line card can dump exception information to the RSC via the MBUS.

Figure 5:
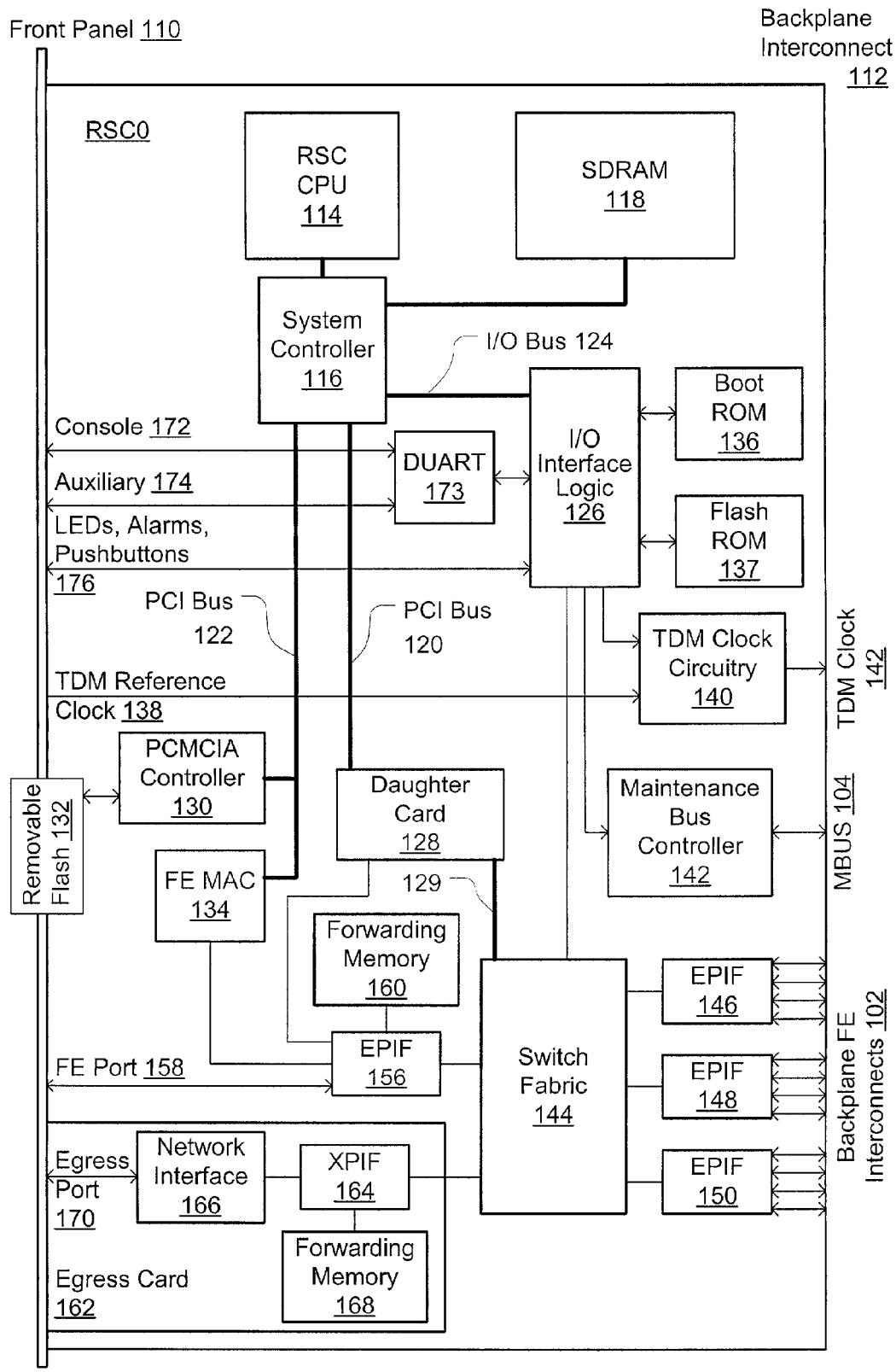
FIG. 5 contains a block diagram for a route switch controller card useful with an embodiment of the invention.

Focusing now on the individual cards that can be inserted in chassis 100, FIG. 5 shows a high-level block diagram for a route shelf controller card RSC0 (RSC1 is typically identical). FIG. 5 is not meant to illustrate board layout, but instead illustrates the front panel connections, backplane connections, and interconnections between the major functional elements of the RSC.

The heart of the RSC is the RSC CPU 114, which in one embodiment is a 64-bit MIPS RM7000 processor, available from Quantum Effect Devices, Inc., Santa Clara, Calif. (at the time of filing of this application, PMC-Sierra, Inc. is in the process of acquiring Quantum Effect Devices). Communication with CPU 114 is handled through system controller 116. In this embodiment, system controller 116 is a GT-64120 system controller, available from Galileo Technology, Inc., San Jose, Calif. (at the time of filing of this application, Marvell Technology Group, Ltd. is in the process of acquiring Galileo Technology). The GT-64120 provides an SDRAM controller for SDRAM 118, two 32-bit PCI buses 120, 122, and device controller connections that make up I/O bus 124.

I/O bus 124 connects to I/O interface logic 126, which can be, e.g., a field-programmable gate array and/or other programmable logic device(s). The particular design of I/O interface logic 126 will be application-dependent, depending on the functionality needed to interface I/O bus 124 with supported devices. In this embodiment, logic 126 makes the following available to CPU 114 from I/O bus 124: boot ROM 136 and onboard flash ROM 137; TDM clock circuitry 140; MBUS controller 142; an eight-bit-wide data connection to switch fabric 144; console port 172 and auxiliary port 174 through DUART 173; and an egress card configuration interface (not shown).

PCI bus 120 connects system controller 116 to daughter card 128. The intended use of daughter card 128 is as a hardware accelerator for packet encryption/decryption. Thus PCI bus 120 facilitates configuration of the daughter card from CPU 114, firmware download of an encryption engine to the daughter card, and relaying encrypted/plaintext traffic between daughter card 128 and CPU 114.

Daughter card 128 also connects to switch fabric 144 through both a low-speed and a high-speed interface. A FE Media-Independent Interface (MII) connects daughter card 128 to switch fabric 144 through EPIF 156, providing a low-speed packet interface directly from daughter board 128 to switch fabric 144, allowing packets to be encrypted/decrypted with no intervention from CPU 114. Bus 129 provides a parallel high-speed packet interface to switch fabric 144. This interface is, e.g., a ViX™ bus compatible with switch fabrics from MMC Networks, Inc., Sunnyvale, Calif. (at the time of filing of this application, Applied Micro Circuits Corporation (AMCC) is in the process of acquiring MMC Networks).

PCI bus 122 supports two CPU peripheral devices, a PCMCIA controller 130 and a FE MAC (Media Access Controller) 134. PCMCIA controller 130 is, e.g., a PD6729 PCMCIA controller available from Intel Corporation. The PD6729 interfaces to one CompactFlash™ slot, allowing the RSC CPU to interface with one compact removable flash memory card 132. Flash memory card 132 is available to hold system images, configuration files, core dumps, line card images, etc.

The second peripheral supported by PCI bus 122 is FE MAC 134. FE MAC 134 provides a direct packet connection from RSC CPU 114 to switch fabric 144 via EPIF 156. FE MAC 134 and EPIF 156 communicate across an FE MII.

Two packet data connections are provided on front panel 110. FE port 158, e.g., a 10/100BaseT port, connects to switch fabric 144 via EPIF 156. An egress port 170 is provided on egress card 162. Egress card 162 is designed to allow substitution of different egress "option" cards, depending on the desired physical egress network media (e.g., FE, Gigabit Ethernet, ATM (Asynchronous Transfer Mode), POS (Packet Over SONET)). Egress card 162 provides an appropriate network interface 166 to egress port 170 (e.g., a Gigabit Ethernet MAC (GMAC)), an XPIF 164 to connect network interface 166 to switch fabric 144, and forwarding memory 168. XPIF 164 is, e.g., a XPIF-300 gigabit-rate switch fabric packet processor, available from MMC Networks.

Figure 6:
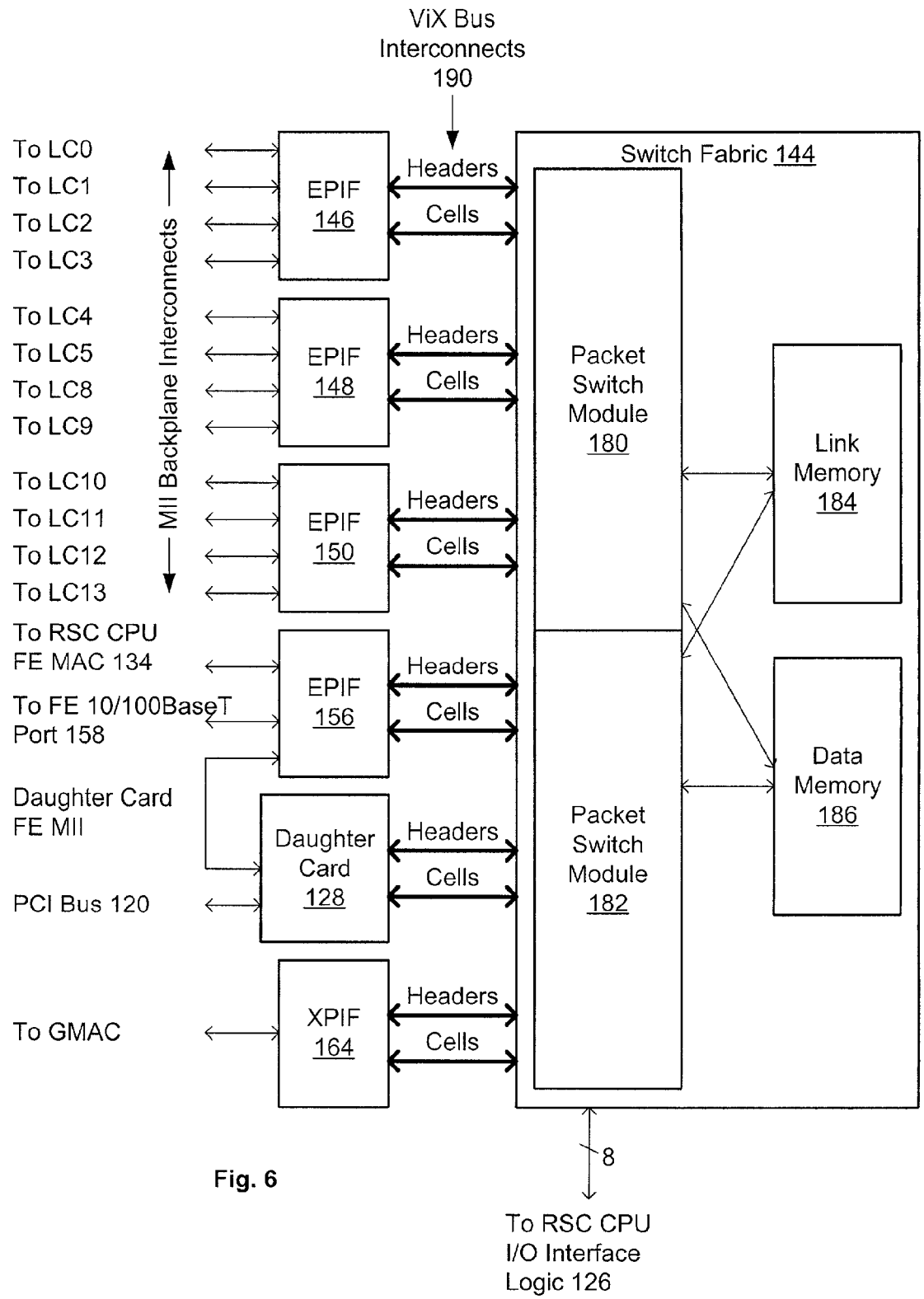
FIG. 6 shows switch fabric connection for a switch fabric useful with an embodiment of the invention.

Further detail on switch fabric 144 and its connected devices are provided in FIG. 6. A switch fabric, in general, is an interconnection of buses and switching elements that provides multiple parallel paths from any input port to any output port. When a packet arrives at an input port, it receives a tag that indicates the proper output port. The switching elements use this tag to automatically route the packet across the switching fabric to the correct output port.

Switch fabric 144 comprises several components: two connected packet switch modules 180 and 182; shared link memory 184; and shared data memory 186. Packet switch modules 180 and 182 are, e.g., nP5400 packet switch modules from MMC Networks. Each of these processors have sufficient bandwidth to support switching for up to 16 FE ports or 2 Gigabit Ethernet ports—when connected together, two such processors provide sufficient bandwidth for the described embodiment. Internally, switch modules 180 and 182 process data in 48-byte payloads (each accompanied by two bytes of header data). Data memory 186 provides a buffer space capable of storing up to 64K payloads that are being switched across the fabric. Link memory 184 stores the corresponding header data for each stored payload.

Packet data links connect to switch fabric 144 through Port InterFaces (PIFs) and ViX™ bus interconnects 190. EPIFs 146, 148, 150, and 156 are EPIF4 programmable BitStream Processors™, available from MMC Networks. Each EPIF4 provides four FE ports, and has the capability to perform L2/L3 packet processing. XPIF 164 is an XPIF-300 BitStream Processor™, also available from MMC Networks, which can support Gigabit Ethernet-rate packet processing. Both the EPIF and the XPIF convert incoming packets into a series of 48-byte cells before passing them to switch fabric 144, and convert a series of cells received from the switch fabric back into a packet. The PIFs also send a header to the switch fabric along with each cell sent, and process headers received from the switch fabric.

Figure 7:
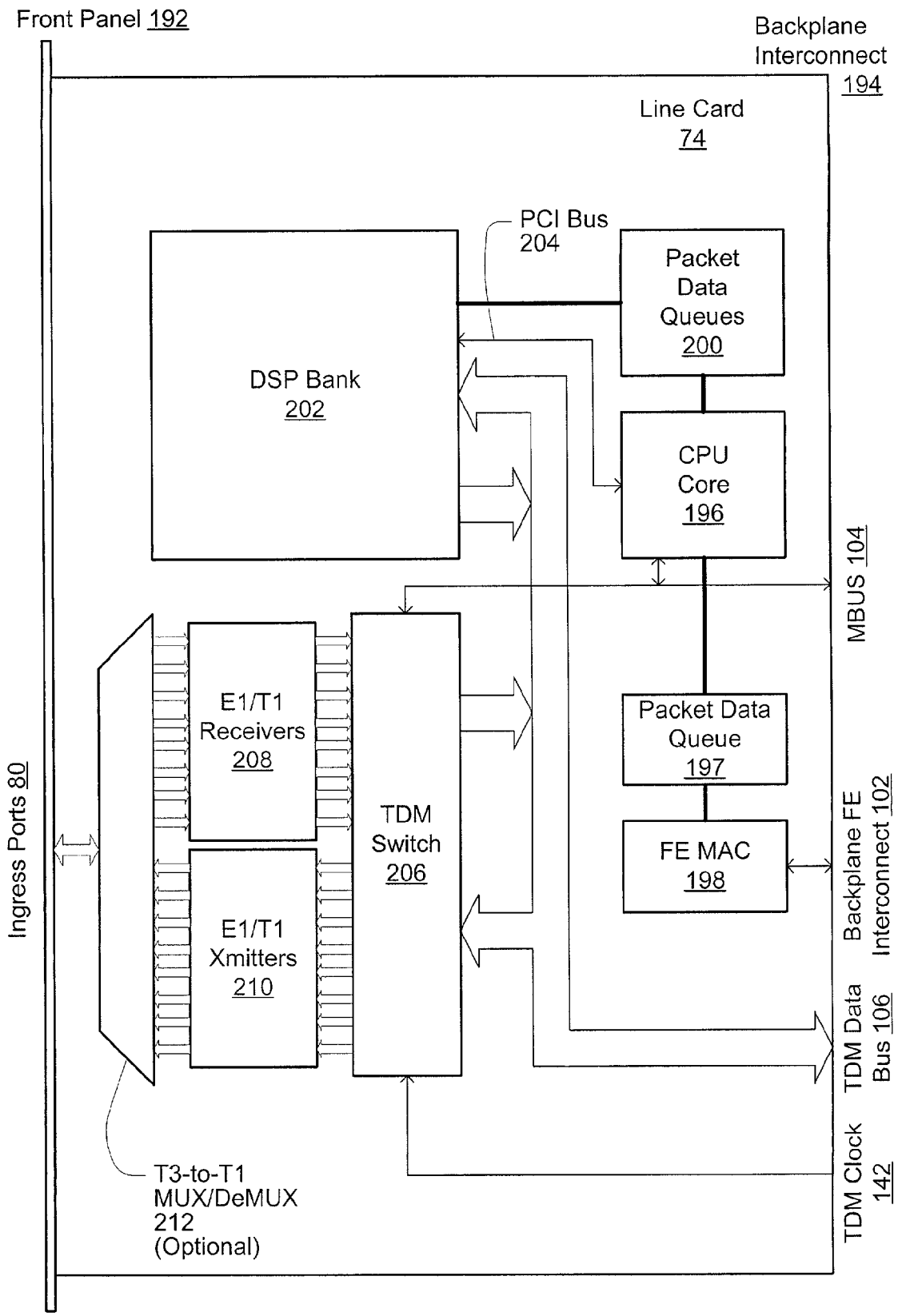
FIG. 7 contains a high-level block diagram for a line card useful with an embodiment of the invention.

Referring now to FIG. 7, line card 74 will be described. CPU core 196 contains a host processor, memory for storing software, packet forwarding tables, etc., and other controller hardware for interfacing the CPU core to the various buses shown in FIG. 7. CPU core 196 connects to packet data queues 197 and 200 (both may be part of the same physical memory). A control bus connects CPU core 196 to MBUS 104 and TDM switch 206.

FE MAC 198 provides packet data connectivity between the line card and the router's switching fabric. FE MAC 198 presents an MII port to backplane FE interconnect 102. FE MAC 198 and CPU core 196 transfer packets between themselves using packet data queue 197.

DSP bank 202 comprises one or more digital signal processors for performing computation-intensive packet processing, such as modem emulation and voice data compression/packetization. For a given data stream, DSP bank 202 is responsible for TDM/packet conversion. Each DSP will typically support packet processing for one or more ingress sessions, as instructed via PCI bus 204.

Ingress line circuitry comprises TDM switch 206 and E1/T1 receivers 208 and transmitters 210. In one implementation, receivers 208 and transmitters 210 connect to eight E1/T1 ports on front panel 192. Optionally, a mux/demux 212 (shown) can connect receivers 208 and transmitters 210 to a T3 physical port on front panel 192. When mux/demux 212 is used, it allows up to 28 T1 connections to be multiplexed into the single T3 port. Receivers 208 and transmitters 210 provide framing and a physical interface for connecting multiple ingress ports 80 to, e.g., a PSTN central office. TDM switch 206 multiplexes/demultiplexes data corresponding to the individual E1/T1 timeslots onto assigned time slots on high-speed TDM data bus 106.

A detailed description for a trunk line card 72 and for a DSP/modem line card 76 has been omitted. Trunk line card 72 contains essentially the same receiver/transmitter/TDM switch circuitry as line card 74, but omits DSP circuitry. DSP/modem line card 76 contains essentially everything else shown in FIG. 7 (but with a larger DSP bank). All line cards contain a host processor to communicate with an RSC card.

With a general description of the network access server hardware completed, overall function of this hardware, as it relates to the invention, will be described for a typical server installation.

Considering first the RSC CPU 114 of FIG. 5, this CPU performs a great number of administrative and server management tasks. Many of these tasks are also performed in a prior art NAS dial shelf or router shelf, such as running standard routing protocols, running drivers for line cards, managing DSP/modem resources and TDM resources, implementing voice and data signaling, providing a command line interface for NAS management, etc. As these tasks are only peripherally affected by the invention and are well understood by those of ordinary skill, they will not be detailed further.

The RSC CPU performs other tasks that specifically support the embodiment described in FIGS. 5 through 8. For instance, the RSC maintains a master forwarding information base (FIB) and adjacency table for all sessions being handled by the NAS. Portions of these data structures are shared with XPIF 164 and with each line card to enable packet distribution and forwarding, as will be described shortly. The RSC performs updates to the shared FIB and adjacency tables on each packet distribution or forwarding device.

The RSC also manages switch fabric 144. For the disclosed MMC switch fabric, the RSC will initialize the switch and set up switch streams for all desired switch fabric input to output port paths. For instance, one set of streams links the RSC CPU PIF port to each PIF port, respectively. A second set of streams links egress PIF ports to each EPIF-to-line card port, respectively. Another stream provides a path that any PIF can use to reach the CPU, and yet another stream provides a path that any EPIF can use to reach a particular egress port. Some or all of these streams may be duplicated, with one set used for data traffic and the other used for control traffic.

Figure 8:
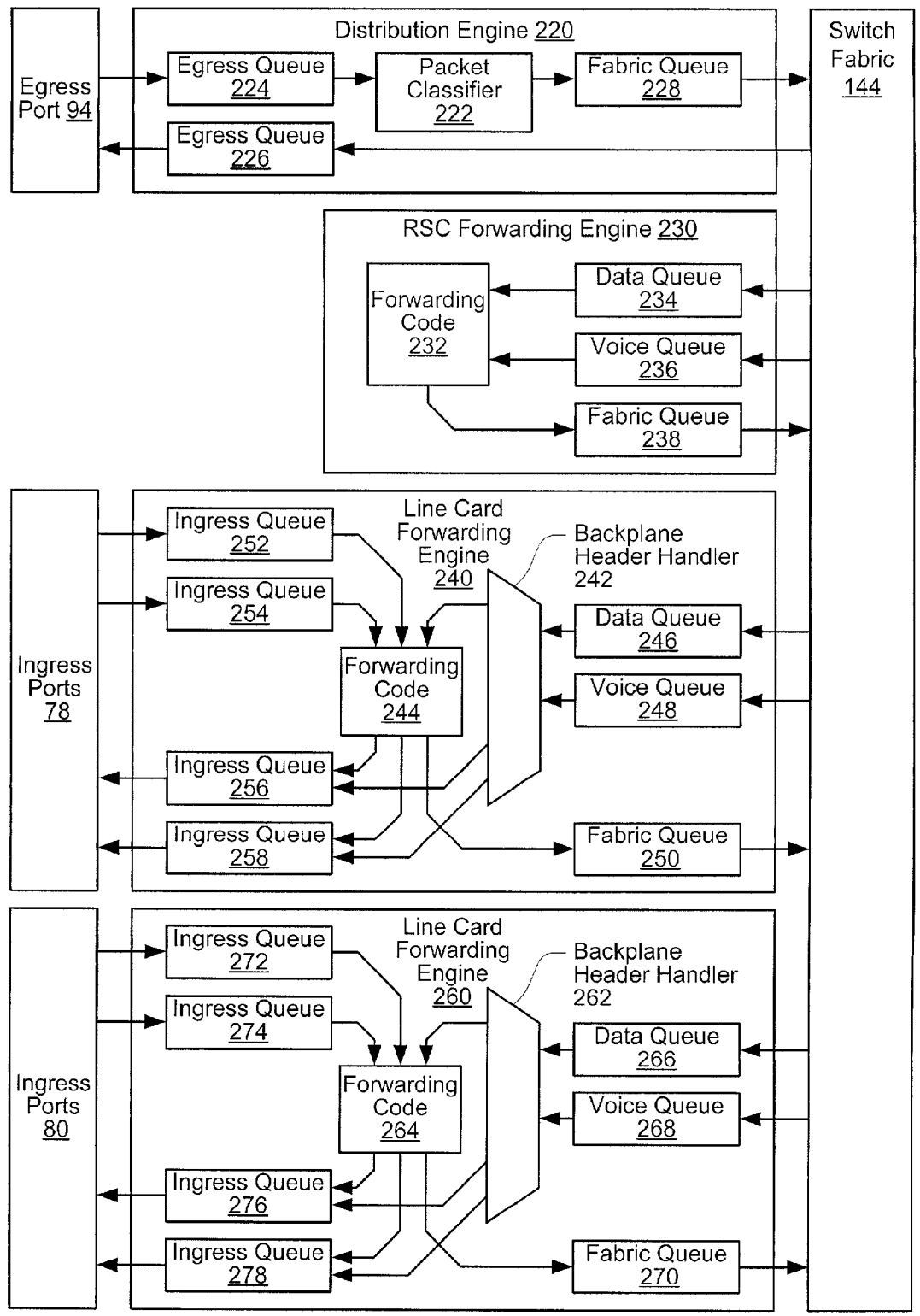
FIG. 8 illustrates the logical placement of queuing, classifying, and forwarding logic for a distribution engine and a group of forwarding engines.

FIG. 8 illustrates a queueing structure for one embodiment of the invention. The forwarding engines (engines 230, 240, 260 are shown) and distribution engine 220 each place packets to be switched in a corresponding switch fabric queue (e.g., fabric queue 228 for distribution engine 220). Upon reaching the head of its fabric queue, each packet is placed on a switching stream that switches it through switch fabric 144 to the appropriate destination and queue.

For the forwarding engines, each engine utilizes a "data" queue and a "voice" queue—this optional partitioning of the queues prevents voice packets (or other time-critical packets) from languishing behind several large data packets, and allows the forwarding engines to allocate their resources fairly between data and voice traffic. Other queuing divisions may also be appropriate, such as internally-generated control packet queues and signaling packet queues, or designated queues on the RSC forwarding engine specifically for packets that failed distribution or forwarding in one of the distributed engines.

The illustrated configuration allow the NAS to route packet traffic efficiently along the most common NAS data paths: ingress port to egress port; ingress port to ingress port; ingress port to RSC; egress port to RSC; egress port to ingress port; and RSC to egress or ingress port. NAS function for each of these possible paths is explored below.

First, consider an IP data packet received at an ingress port 78, through a modem (not shown) on the same line card as forwarding engine 240. Each such packet enters an ingress port queue (either 252 or 254), where it waits its turn to be considered by forwarding code 244.

When the packet is considered by forwarding code 244, there are several possible processing paths that could be taken. Some types of data packets, such as ISDN signaling, PPP or L2TP control packets, etc., are to be interpreted by the RSC—if these signaling and control packets can be identified as such, forwarding becomes a matter of sending the packet on a data stream to an input queue on RSC forwarding engine 230. For all other data packets, the forwarding code searches its local FIB table for a route entry match corresponding to the packet's destination IP address. If a matching FIB entry is found, this entry points to a corresponding entry in the adjacency table—an entry that indicates the appropriate switching stream, output port, link layer encapsulation, etc. for the packet. Finally, if no matching FIB entry can be found, the packet must be "punted" (i.e., forwarded to the RSC as a packet that cannot be processed by the forwarding engine). The RSC is tasked with deciding what to do with packets that the distributed forwarding engines can't handle.

When forwarding engine 240 successfully locates a FIB entry, the packet is processed. Forwarding code 244 decrements the packet's time-to-live, computes a new checksum, and performs any other appropriate IP housekeeping tasks. The L2 packet header is stripped and then rewritten with the proper encapsulation for the packet's NAS output port. Finally, unless the packet is going back out an ingress port served by the same line card (e.g., port 256 or 258), a backplane header is prepended to the packet. The backplane header indicates the stream ID to be used to reach the switch port of exit and a packet type. The packet type will indicate to the receiving forwarding engine how it should process the packet.

When forwarding engine 240 must punt the packet to RSC forwarding engine 230, the packet's existing headers are not modified. The packet is simply prepended with a backplane header that will direct the packet to the appropriate input queue (234 or 236) for forwarding engine 230.

When the attached EPIF receives a packet, it interprets the backplane header and queues the packet for transmission across the appropriate switching stream. The packet then traverses the switch fabric. If the packet is bound for an egress port, the PIF serving that port receives the packet, removes the backplane header, and transmits the packet out the egress port. If the packet is bound for another line card, the appropriate PIF receives it and transmits the packet across the backplane FE to the appropriate card (e.g., queue 266). If the packet is bound for the RSC, the PIF transmits the packet across the MII to the FE MAC on the RSC card.

Next, consider a packet received at the egress port. The packet may be a data packet destined for one of the ingress ports, a control packet destined for the RSC, an L2TP data packet destined for one of the ingress ports, or a voice packet destined for one of the ingress ports. Packet classifier 222 of distribution engine 220 attempts to determine the packet type, e.g., as IP/non-IP, control/data/VoIP, etc. Packet classifier 222 then uses the packet type to perform a search, in the table corresponding to that packet type, for the appropriate stream ID for that packet. When a stream ID is successfully located, packet classifier 222 prepends the packet with a backplane header identifying the stream that flows to the desired line card and designates the packet as an input-type packet.

The backplane header also contains a forwarding tag. The forwarding tag uniquely identifies the packet classification type, and table entry index matched by the packet classifier. "Unique" means that—although forwarding tags can be duplicated for different line cards—on each line card, the session tag allows the forwarding engine to associate the packet with a unique adjacency table entry. Preferably, this tag is a pointer that allows the forwarding engine to directly access the table entry that matches the table entry found by the distribution engine.

Figure 9:
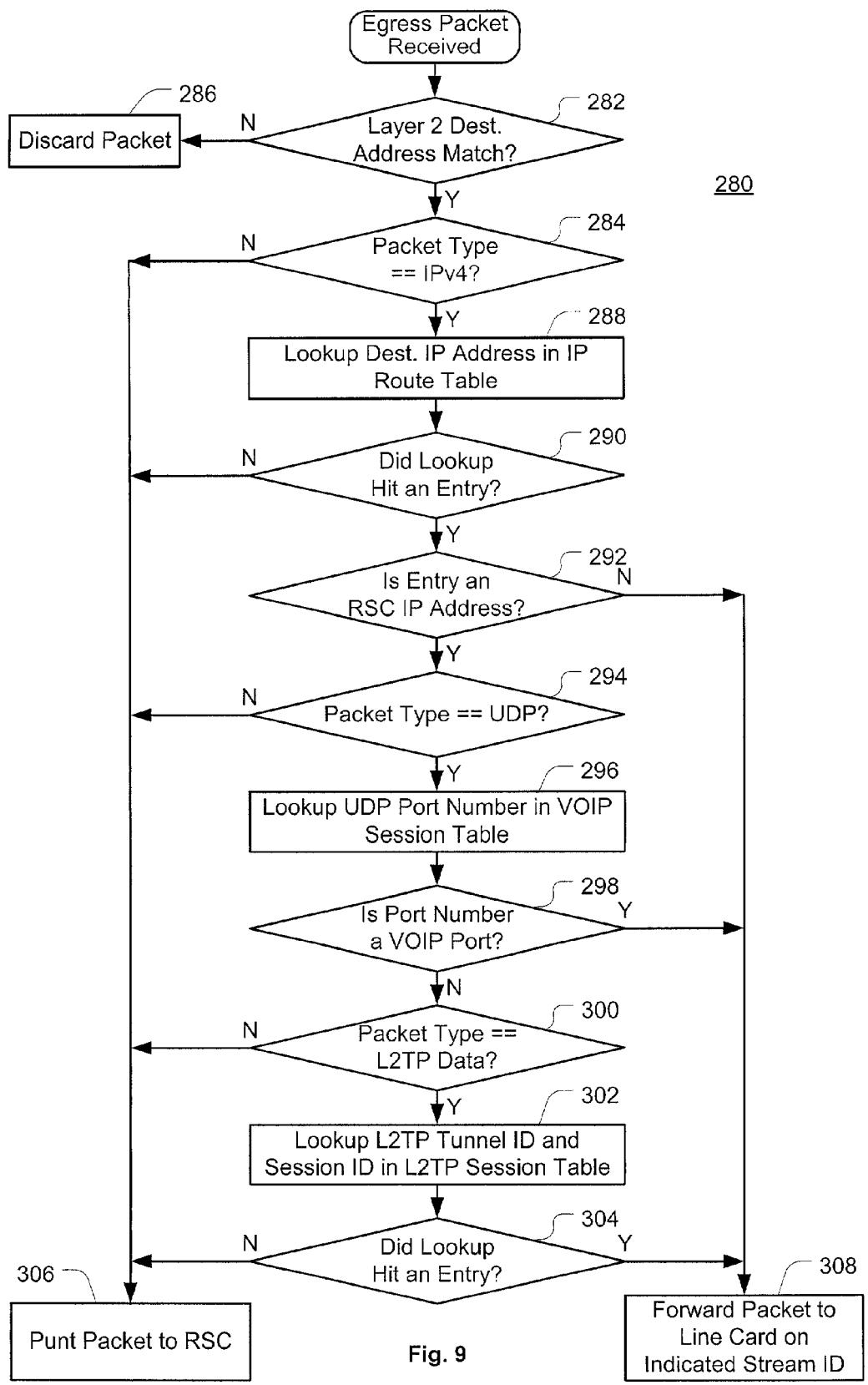
FIG. 9 contains a flow chart for distribution engine operation according to an embodiment of the invention.

FIG. 9 contains a flowchart illustrating one method of operation for distribution engine 220. When an egress packet is received, block 282 first examines the link layer header, checking the link layer destination address for a match. When the packet is not addressed to the NAS, it is dropped (block 286). Otherwise, block 284 checks the packet type. In this embodiment, distribution engine 220 can only perform route lookups for IP version 4 (IPv4) packets—all other packet types are punted to the RSC (see block 306).

If a packet is an IPv4 packet, block 288 takes the destination address out of the IP header and performs a lookup in the distribution engine's IP route table. For instance, FIB entries can be stored in a ternary content-addressable memory (TCAM) in an order such that the TCAM returns a longest-prefix match for the destination address.

Decision block 290 branches based on the success of the TCAM lookup. If the lookup is unsuccessful, control branches to block 306, and the packet is punted to the RSC. Otherwise, processing continues at block 292.

Block 292 examines the route entry returned by the TCAM. If the entry indicates the RSC as the appropriate route for the packet, further processing is needed. Otherwise, processing branches to block 308. Block 308 forwards the packet to the appropriate line card on the indicated stream ID.

There are several reasons why an indicated route may pass through the RSC. Some packets are actually bound for the NAS itself, and thus the RSC. But UDP packets addressed to the NAS itself may be so addressed because the NAS is an L2TP tunnel endpoint and a voice packet endpoint. Packet classifier 222 attempts to identify L2TP data packets and voice data packets, allowing them to be switched directly to the line card that terminates an L2TP or voice call.

Decision block 294 branches based on whether or not the packet is a UDP packet. Non-UDP packets are punted to the RSC for processing. For UDP packets, block 296 retrieves the UDP port number from the packet header and attempts a lookup in a VOIP session table. Decision block 298 then branches based on the lookup results. For instance, according to one convention, valid VOIP port numbers are even numbers between 16384 and 32766—when the port number falls in this range, it will be forwarded to the appropriate line card for voice processing.

For UDP port numbers that are not valid VOIP port numbers, block 300 classifies the packet as L2TP data/non-L2TP data. UDP packets that are not voice packets and are non-L2TP data are punted at this point to the RSC. Otherwise, a packet's L2TP tunnel ID and session ID are lookup up in an L2TP session table. Upon a successful hit, the packet will be forwarded by block 304 to the appropriate line card for L2TP processing. Finally, if the lookup fails, the packet is punted to the RSC.

Block 308 is reached after one or more successful FIB lookups. The FIB lookup causing the branch to block 308 will return a pointer to an adjacency table entry containing the switching stream and backplane header to be used for the packet. Block 308 attaches the backplane header to the packet (including inserting the appropriate forwarding tag), and dispatches the packet over a stream directed to the appropriate line card. Likewise, when a lookup fails, the packet is punted to the RSC at block 306 using an appropriate switching stream.

When distribution engine 220 sends an egress packet to one of the forwarding engines, that forwarding engine queues the packet for its backplane header handler (e.g., handler 242 of forwarding engine 240 in FIG. 8). A field on the backplane header can be used to determine whether the packet has already passed through the forwarding code of the RSC or another line card. If this is the case, handler 242 uses another field to determine which outbound ingress interface that the packet is bound for (e.g., queue 276 or 278). If the packet has not passed through forwarding code already (i.e., the packet was received at an egress interface), header handler 242 passes the packet to forwarding code 244.

Forwarding code 244 reads the forwarding tag from the backplane header, maps the forwarding tag to an entry in its own FIB tables, and determines the ingress port/time slot and modem/DSP resource responsible for the packet. The packet updater can perform layer 2 processing on the packet (as if the updater were located physically at the egress port). The packet is updated and sent to the responsible modem/DSP resource.

The preceding description assumes that the distribution engine and forwarding engines have access to current FIB and adjacency tables for the NAS, or at least those portions of the tables that each engine is likely to encounter. The route switch controller is responsible for maintaining master FIB and adjacency tables, and informing distribution engines and forwarding engines when and with what to update those tables. The distribution engines and forwarding engines maintain local copies of the information supplied to them by the RSC.

Referring to FIG. 10, RSC master routing tables 310, 312, 314, and 316 are illustrated. Master routing table 310 is an IP routing table for packets received at the egress port; each destination IP route entry in the table is cross-referenced to a forwarding tag, line card number, modem number, and an adjacency table pointer. As new calls are established, the RSC adds new entries to table 310, and as calls are disconnected, the RSC deletes the corresponding entries in table 310.

Tables 312 and 314 are similar to table 310. But table 312 is indexed by VoIP UDP port number, and can thus be used to map VoIP calls to line card resources. And table 310 is indexed by L2TP session ID/L2TP tunnel ID, and can thus be used to map L2TP calls to line card resources.

Table 316 is an adjacency table. PPP sessions, L2TP sessions, and VoIP sessions are represented in the adjacency table. The table contains switch fabric stream IDs that are to be used for various types of communication with each card. Other information, such as layer 2 encapsulation for an egress port, and backplane header encapsulation, can also be part of the adjacency table.

The RSC determines what portion of each of tables 310, 312, 314, and 316 should be shared with each particular line card or egress card. At all times, though, the RSC can use the master table to route any packet received by the NAS. Thus, misrouted, oddball, or confusing packets can always be punted to the RSC for a routing determination in accordance with the full routing table.

Figure 11:
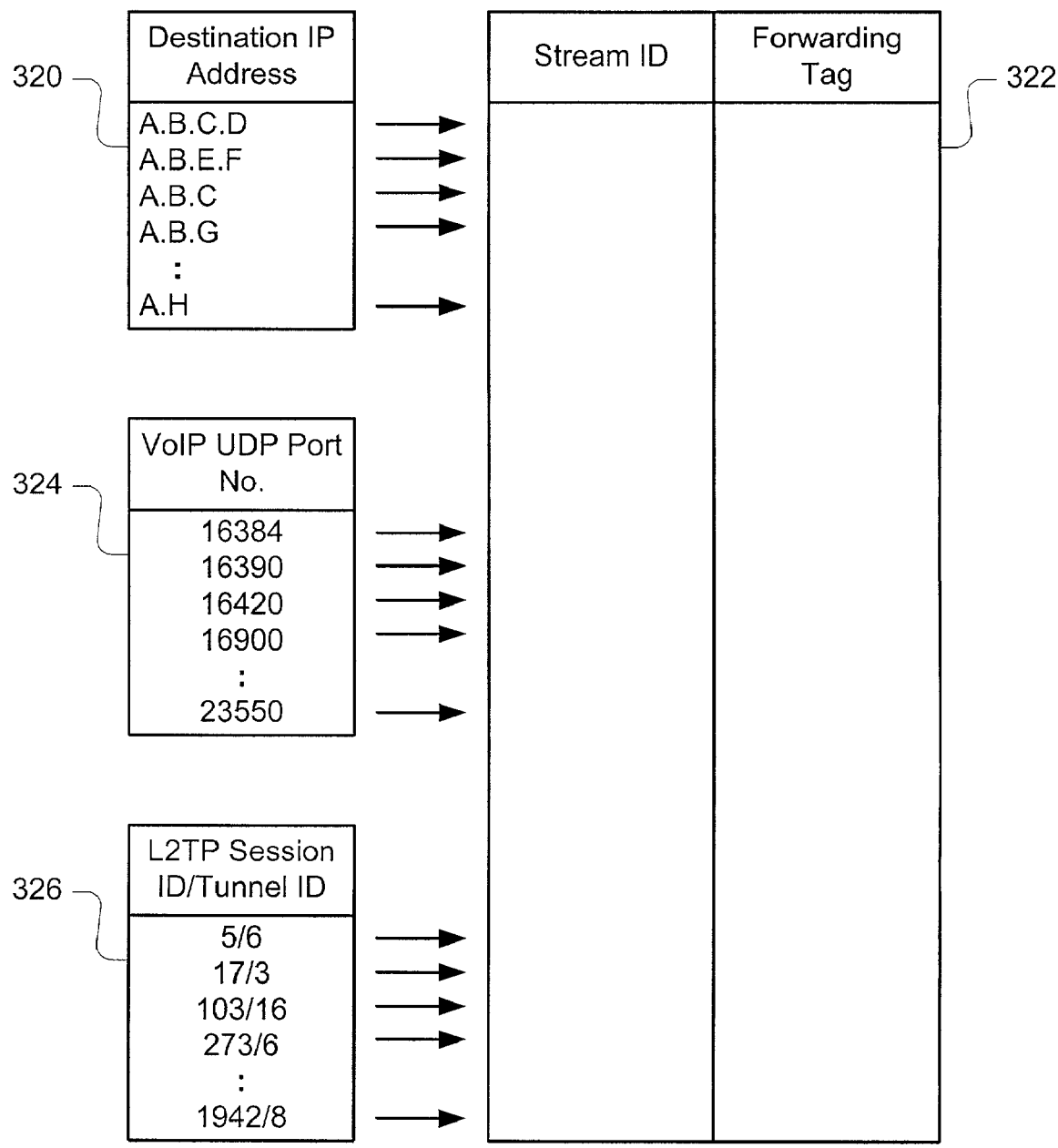

Considering first the portion of the master routing tables shared with the egress card, FIG. 11 depicts distribution FIB and adjacency tables 320, 322, 324, 326, and 328. The RSC shares distribution routes (those that exit the server at an ingress port) with the distribution engine on the egress card. In this particular embodiment, the shared information is limited to a forwarding tag, the switch fabric stream ID, and the backplane header for such routes. The forwarding tag may, in the alternative, be communicated to the distribution engine embedded in a backplane header that the engine is to attach to matching packets.

The distribution engine uses the shared information from the master tables to build and maintain tables 320, 322, 324, and 326. The distribution engine stores the IP packet distribution routes it receives by storing the IP routing address in TCAM table 320, sorted by prefix length, longest prefix first; an adjacency table pointer and forwarding tag are stored in a corresponding location in mapping table 322 for each IP routing address. When a packet IP destination address is compared against the list of addresses stored in TCAM table 320, the result is the TCAM memory address of the longest matching IP prefix. This TCAM memory address serves as a pointer offset into stream ID/forwarding tag table 322. Stream ID/forwarding tag table 322 stores the appropriate stream ID and forwarding tag. The line card adjacency table pointer from mapping table 322 is inserted in the backplane header template, and the backplane header is prepended to the packet before dispatch to the switch fabric.

Voice port table 324 and tunnel session table 326 also map to adjacency table 328. Tables 324 and 326 may be implemented with content-addressable memory, a hashing function, or by partitioning available voice port and/or tunnel port space among the line cards.

Line cards typically implement a subset of the forwarding code implemented in the RSC. FIB table and adjacency table formats in each line card can be essentially identical to the FIB table and adjacency table formats in the RSC. For adjacency entries that are local to the line card, the line card need not, however, store a backplane header.

Although the forwarding engine does not perform a second routing lookup, it may verify the packet headers against the routing lookup result obtained from the session tag in the backplane header. If the verification fails, the packet may be dropped, or passed to the RSC for processing.

It is to be understood that although many of the NAS functions described above can be designed into special-purpose hardware, a combination of software and programmable hardware is preferred. Typically, each "engine" will be an executable process running on a processor that performs other tasks as well. Each processor may have its executable processes stored in a dedicated non-volatile memory, e.g., ROM, flash, optical, or magnetic storage media. More typically, the RSC processor will boot first, e.g., from its own non-volatile memory, and then distribute executable images to the switch fabric, PIFs, and line cards as each is brought on line.

Many variations on the type and format of information passed from the distributing processor to a forwarding processor are possible. The forwarding tag can be an offset into a FIB table address space. It can also be one or more session identifiers, such as ingress port/time slot, particularly where the adjacency table is sorted by these identifiers. An indication of the status of the packet, i.e., what processing needs to be done, can also be passed to the forwarding engine. For instance, if the distributing engine has verified a header checksum, this can be indicated to the forwarding engine so that the verification task need not be repeated.

The disclosed embodiments presented herein are exemplary. Local tag-switching can be used for some types of packets and not others, e.g., IP data packets but not VoIP or L2TP, or some other combination of usage. Various other modifications to the disclosed embodiments will be obvious to those of ordinary skill in the art upon reading this disclosure, and are intended to fall within the scope of the invention as claimed.

What is claimed is:

1. A method of operating a network access server, the method comprising:
   using a first processor in the network access server to perform a routing table lookup for a packet received at an egress port;
   determining, from the results of the routing table lookup, a forwarding tag, a second processor responsible for processing and forwarding the received packet, and a switch fabric stream ID for passing the received packet to the second processor, the second processor selected from the plurality of forwarding processors in the network access server;
   passing the forwarding tag and the received packet to the second processor; and
   in the second processor, retrieving routing information for the received packet from a forwarding routing table, using the forwarding tag to access the routing information in the forwarding routing table.

2. The method of claim 1, wherein passing the forwarding tag and the received packet to the second processor comprises
   the first processor prepending an intraserver header to the received packet, the header containing the forwarding tag;
   sending the received packet to the second processor using the switch fabric stream ID;
   the second processor reading the identifier from the intraserver header; and
   the second processor removing the intraserver header from the received packet.

3. The method of claim 1, further comprising
   maintaining a master routing table at a route switch controller within the network access server;
   maintaining a distributing routing table at the first processor, the distributing routing table containing entries from the master routing table that allow determination of the appropriate forwarding tag and the appropriate second processor for the received packet; and
   maintaining a forwarding routing table at each forwarding processor, the forwarding routing table for a particular forwarding processor keyed to the forwarding tags known to the first processor and containing entries from the master routing table that allow that forwarding processor to process packets for network access sessions assigned to that processor.

4. The method of claim 3, wherein maintaining a distributing or forwarding routing table comprises the route switch controller sending routing table updates to the processor associated with that routing table, and that processor updating that routing table.

5. The method of claim 1, further comprising the first processor sub-classifying the received packet according to layer three or higher headers attached to the packet, wherein the forwarding tag is only sent to the second processor for certain subclasses of received packets.

6. The method of claim 5, further comprising passing an indication of packet subclass to the second processor.

7. The method of claim 1, further comprising the first processor passing a processing indication to the second processor, the processing indication informing the second processor as to what processing remains to be done on the packet is stored in an intraserver header.

8. The method of claim 1, wherein the forwarding a indicates the ingress port to which the second processor should route the data in the received packet.

9. The method of claim 1, further comprising receiving the received packet at an egress port of an egress card, the egress card including the first processor.

10. The method of claim 1, further comprising transmitting at least a portion of the received packet from an output port of a line card, the line card including the second processor.

11. A data network access concentrator comprising:
    multiple ingress ports, each of the ingress ports having the capability to support data communication over one or more access sessions associated with the ingress port;
    at least one egress port to facilitate packet data communication with a data network;
    a plurality of forwarding engines to process packets received by the access concentrator and forward processed packets toward an appropriate one of the ingress ports or the at least one egress port, each of the forwarding engines having the capability to support data communication over a plurality of the ingress port access sessions;
    a distribution engine to perform respective routing searches for each of a plurality of packets received at the at least one egress port, and to distribute each of the packets, along with respective results of the respective routing search, to a respective one of the forwarding engines supporting data communication for the respective ingress port access session associated with each of the packets, the respective forwarding engine retrieving routing information for each of the packets from a routing table using the respective results; and
    a route switch controller to manage the access sessions associated with the ingress ports, wherein the route switch controller comprises a default forwarding engine, each of the other forwarding engines and the distribution engine having the capability to send a packet to the default forwarding engine when the appropriate route for that packet is unknown to the forwarding or distribution engine attempting to route that packet.

12. The access concentrator of claim 11, wherein the route switch controller has the capability to maintain a master routing table and provide routing table updates from the master routing table to the forwarding engines and the distribution engine.

13. The access concentrator of claim 12, wherein the master routing table comprises an IP routing table.

14. The access concentrator of claim 11,
    wherein the distribution engine has the capability to distribute data packets, tunneled packets for a tunnel session terminated at the access concentrator, and voice packets for a packet voice session terminated at the access concentrator; and
    wherein the distribution engine comprises a classifier to determine, from header data of a packet, whether that packet can be classified as a tunneled packet or a voice packet.

15. The access concentrator of claim 11, wherein the distribution engine and the at least one egress port are on an egress card.

16. The access concentrator of claim 11,
    wherein the ingress ports are located on one or more line cards; and
    wherein each of the line cards includes one of the forwarding engines.

17. A data network access concentrator comprising:
data packet communication means for interfacing with a packet data network;
multiple network access means for communicating data associated with a plurality of network access sessions across an access network;
multiple forwarding means for processing data packets and then forwarding those data packets toward either the data packet communication means, for ingress packets, or toward one of the network access means, for egress packets, each forwarding means associable with multiple network access sessions and at least one network access means, and performing data packet processing and forwarding related to those associations; and
distributing means for performing a routing search for a data packet received from the packet data network, and for distributing that data packet, along with a result of the routing search, to a respective one of the forwarding means responsible for processing that packet, the respective forwarding means enabled to use the result of the routing search to retrieve information from a routing table;
a route switch controller to manage the access sessions associated with the ingress ports, wherein the route switch controller comprises a default forwarding engine, each of the other forwarding engines and the distribution engine having the capability to send a packet to the default forwarding engine when the appropriate route for that packet is unknown to the forwarding or distribution engine attempting to route that packet.

18. A computer readable non-volatile medium containing computer instructions that, when executed, cause multiple processors to perform a method for processing data packets in a network concentrator, the method comprising, for a packet received at an egress port:
using a first processor in the network access server to perform a routing table lookup for a received packet;
determining, from the results of the routing table lookup, a forwarding tag and a second processor responsible for processing and forwarding the received packet, the second processor selected from a plurality of forwarding processors in the network access server;
passing the forwarding tag and the received packet to the second processor; and
retrieving routing information for the received packet in the second processor from the forwarding routing table, using the forwarding tag to determine the location of the routing information in the forwarding routing table.

19. The computer readable non-volatile medium of claim 18, wherein passing the forwarding tag and the received packet to the second processor comprises:
the first processor prepending an intraserver header to the received packet, the header containing the forwarding tag;
sending the received packet to the second processor;
the second processor reading the forwarding tag from the intraserver header to determine the location of the routing information in the forwarding routing table; and
the second processor removing the intraserver header from the received packet.

20. The computer readable non-volatile medium of claim 18, wherein the method further comprises maintaining a master routing table at a route switch controller within the network access server;
maintaining a distributing routing table at the first processor, the distributing routing table containing entries from the master routing table that allow determination of the appropriate forwarding tag and the appropriate second processor for the received packet; and
maintaining a forwarding routing table at each forwarding processor, the forwarding routing table for a particular forwarding processor keyed to the forwarding tags known to the first processor and containing entries from the master routing table that allow that forwarding processor to process packets for network access sessions assigned to that processor.

21. The computer readable non-volatile medium of claim 20, wherein maintaining a distributing or forwarding routing table comprises the route switch controller sending routing table updates to the processor associated with that routing table, and that processor updating that routing table.

22. The computer readable non-volatile medium of claim 18, wherein the method further comprises the first processor sub-classifying the received packet according to layer three or higher headers attached to the packet, and wherein the routing table identifier is only sent to the second processor for certain subclasses of received packets.

23. The computer readable non-volatile medium of claim 22, wherein the method further comprises passing an indication of packet subclass to the second processor.

24. The computer readable non-volatile medium of claim 18, wherein the method further comprises the first processor passing a processing indication to the second processor, the processing indication informing the second processor as to what processing remains to be done on the packet is stored in an intraserver header.

25. The computer readable non-volatile medium of claim 15, wherein the routing table lookup indicates an ingress port that the second processor should route the data in the received packet to.

* * * * *

UNITED STATES PATENT AND TRADEMARK OFFICE
CERTIFICATE OF CORRECTION

PATENT NO. : 7,616,646 B1  
APPLICATION NO. : 09/735718  
DATED : November 10, 2009  
INVENTOR(S) : Ma et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1146 days.

Signed and Sealed this

Nineteenth Day of October, 2010

David J. Kappos  
*Director of the United States Patent and Trademark Office*

UNITED STATES PATENT AND TRADEMARK OFFICE
CERTIFICATE OF CORRECTION

| | | |
|---|---|---|
| PATENT NO. | : 7,616,646 B1 | |
| APPLICATION NO. | : 09/735718 | |
| DATED | : November 10, 2009 | |
| INVENTOR(S) | : Stephen Ma et al. | |

It is certified that error appears in the above-identified patent and that said Letters Patent is hereby corrected as shown below:

Column 15, line 12:   In Claim 1, delete "the" and insert -- a --, therefor.

Column 15, line 65:   In Claim 8, delete "a" and insert -- tag --, therefor.

Column 17, line 46:   In Claim 18, delete "the" and insert -- a --, therefor.

Column 18, line 47:   In Claim 25, delete "15," and insert -- 18, --, therefor.

Signed and Sealed this
Twenty-first Day of June, 2011

David J. Kappos
*Director of the United States Patent and Trademark Office*